United States Patent [19]
Helling

[11] 3,894,242
[45] July 8, 1975

[54] ELECTRICAL POWER CONVERTING APPARATUS

[75] Inventor: Oscar D. Helling, Mankato, Minn.

[73] Assignee: GTO Enterprises, Inc., St. Peter, Minn.

[22] Filed: Jan. 10, 1974

[21] Appl. No.: 432,220

Related U.S. Application Data

[63] Continuation of Ser. No. 366,327, June 4, 1973, which is a continuation of Ser. No. 232,126, March 6, 1972.

[52] U.S. Cl. .................... 307/10 R; 322/7; 322/99; 307/16
[51] Int. Cl.² ...................... H02J 3/12; H02J 4/00
[58] Field of Search ............ 307/10 R, 16; 322/7, 8; 320/2, 54, 56; 321/8

[56] References Cited
UNITED STATES PATENTS

| | | | |
|---|---|---|---|
| 3,409,816 | 11/1968 | Foster | 320/2 UX |
| 3,456,119 | 7/1969 | Schneider | 307/10 R X |
| 3,471,706 | 10/1969 | Schneider | 307/10 R |
| 3,614,459 | 10/1971 | Watson | 307/10 R |

*Primary Examiner*—J. D. Miller
*Assistant Examiner*—Robert J. Hickey
*Attorney, Agent, or Firm*—Merchant, Gould, Smith & Edell

[57] ABSTRACT

Power converting apparatus for use with an automotive electrical system or the like having an electric storage battery and a charging circuit for the battery including a variable output alternator and a regulator for controlling the alternator output voltage to the battery. The power converting apparatus has a power outlet and switching means for selectively bypassing the voltage regulator and connecting the alternator output directly to the power outlet. The power converting apparatus further includes means for indicating a predetermined voltage level of the alternator output (preferably 110 volts) in the bypassed state, thereby providing standard electrical power for all but inductive loads. A circuit breaker cooperates with the power outlet to prevent damage to its load or to the alternator by reason of excessive current flow.

17 Claims, 2 Drawing Figures

ELECTRICAL POWER CONVERTING APPARATUS

This is a continuation of application Ser. No. 366,327, filed on June 4, 1973, which was a continuation of prior application Ser. No. 232,126, filed on Mar. 6, 1972.

The invention is directed to apparatus for enabling the alternator or generator of an automotive electrical system or the like to be utilized as a standard 110 volt electrical source.

Conventional automotive electrical systems typically include an electrical storage battery and a charging circuit for maintaining the battery output at a voltage level sufficient to start the car and operate its electrical equipment. The charging circuit usually comprises an alternator or generator driven by the engine, the output of which varies as a direct function of engine speed, and a voltage regulator which maintains the charging circuit at a predetermined voltage level sufficient to keep the storage battery charged.

Because the output capability of the alternator or generator must be sufficient to keep the battery charged even at an idling speed, its output at increased engine speeds is generally far beyond requirement of the battery charging function. Generally speaking, alternators and generators found on todays' cars are easily capable of generating well over 110 volts, which is the standard voltage level for residential usage and the level at which most residential electrical equipment operates.

My invention is directed to power converting apparatus usable with the charging circuit of an automotive electrical system or the like which selectively bypasses the voltage regulator and directs the alternator or generator output directly to a power outlet preferably consisting of a grounded plug receptacle. To insure that the alternator or generator is producing 110 volts, the power converting apparatus includes an indicating light which is actuated when that voltage level is reached. The converting apparatus also includes a circuit breaker which cooperates with the power outlet to prevent damage by reason of excessive current flow to the alternator itself or to any electrical equipment receiving power through the outlet.

In charging circuits which employ alternators, bypassing the regulator necessarily breaks the electrical connection between the battery and the field winding of the alternator, thereby destroying the magnetic field through which voltage is induced. My invention power converting apparatus therefor includes means for exciting the field winding by the battery directly when the voltage regulator is bypassed to permit the alternator to continue its generation of voltage.

One further feature of my inventive apparatus resides in the inclusion of a resistive load so connected with respect to the power outlet that the alternator will always be loaded when the voltage regulator is bypassed, whether or not electrical equipment is connected to the power outlet. This precludes damage to the alternator by reason of excessive current flow therethrough; and, together with the circuit breaker mentioned above, ensures completely safe operation of the electrical system when the voltage regulator is bypassed.

DESCRIPTION OF THE PREFERRED EMBODIMENT

Figure 1:
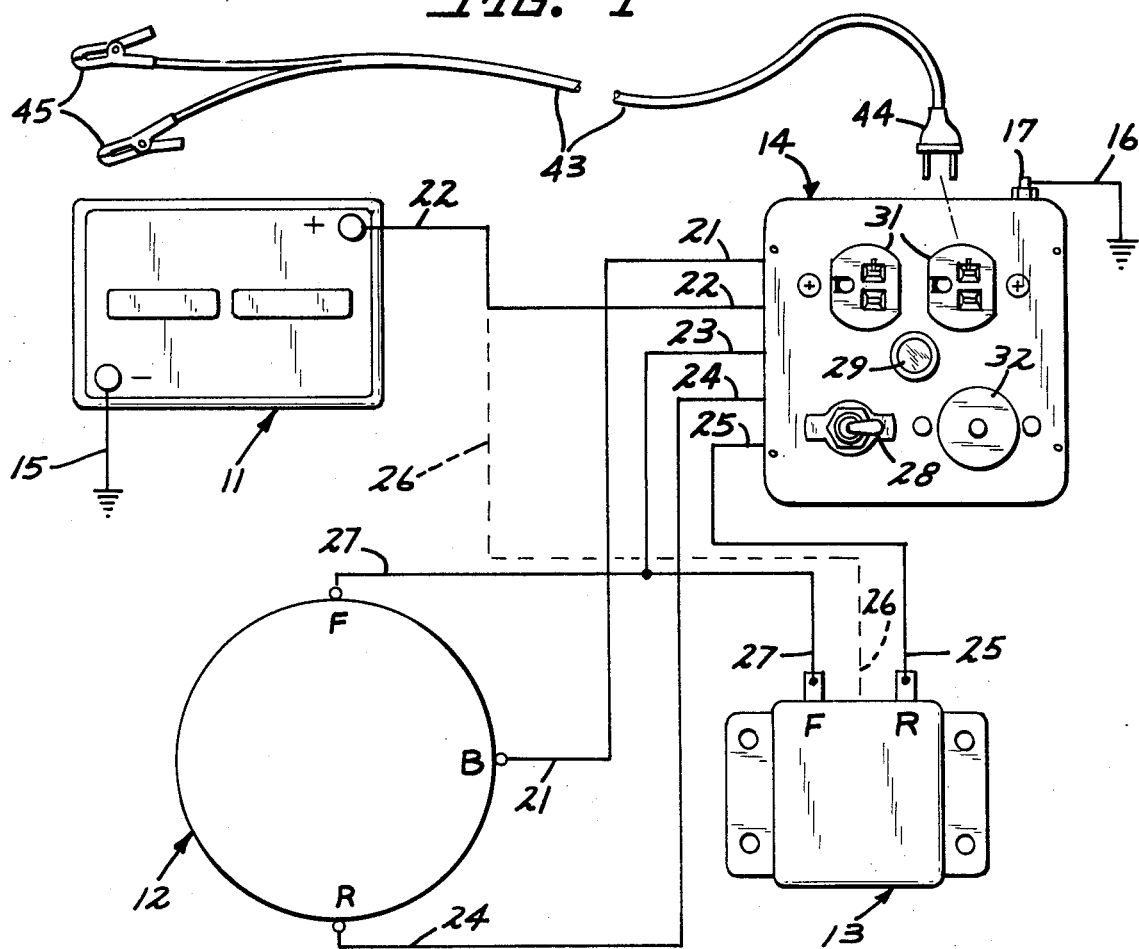
FIG. 1 is a schematic representation of a conventional automotive electrical system in which power converting apparatus embodying the inventive principle is connected.

With initial reference to FIG. 1, a conventional automotive electrical system is shown to comprise an electrical storage battery 11, an alternator 12 and a voltage regulator 13. Power converting apparatus embodying the inventive principle is represented generally by the numeral 14.

In this particular system, the negative terminal of battery 11 is connected to the closed ground of the automobile by a ground cable 15. Similarly, the container housing for the power converting apparatus 14, which is metallic in the preferred embodiment, is grounded by a ground wire 16 connected to a stud 17.

Alternator 12 is conventional in nature, having a battery terminal B which is its primary output terminal, a relay terminal R which provides a secondary output normally connected to a field relay in voltage regulator 13 as described below, and a field terminal F which leads to the alternator field winding.

Voltage regulator 13 is also conventional in nature, including a voltage regulating relay which, through the field terminal F, controls excitation of the alternator field winding, and a field relay which, through a relay terminal R, normally senses the secondary output at the alternator terminal R in the known manner. Operation of these two relays in the electrical system is described in further detail below.

In the preferred embodiment, power converting apparatus 14 includes five lead wires 21-25 as shown. Lead wire 21 is connected directly to the battery terminal B of alternator 12. Lead wire 22 is connected to the positive terminal of battery 11 and is also connected to the voltage regulator 13 through a connecting circuit represented by the broken line 26. Connecting circuit 26 varies from system to system, and may include the ignition key switch, indicating lamps, etc. Its general function is to connect the voltage regulating relay of the voltage regulator 13 in relation to battery 11 to control the application of charging voltage thereto.

A connecting wire 27 interconnects the respective field terminals F of the alternator 12 and voltage regulator 13, and lead wire 23 from apparatus 14 is connected at an intermediate point on the wire 27 as shown. Lead wire 24 is directly connected to the relay terminal R of alternator 12, and lead wire 25 is connected directly to the relay terminal R of voltage regulator 13.

The metallic container of power converting apparatus 14 houses an on/off toggle switch 28, an indicating light 29, a duplex grounded plug receptacle 31 and a circuit breaker 32.

Figure 2:
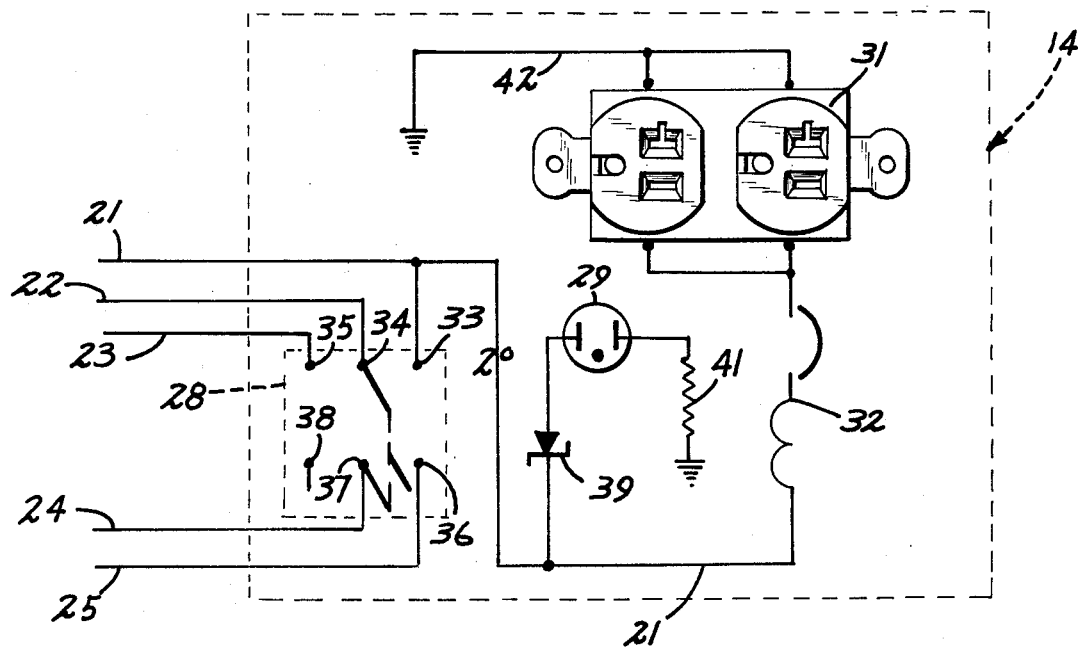
FIG. 2 is a schematic representation of components of the inventive power converting apparatus and the manner in which they are connected.

With additional reference to FIG. 2, switch 28 is of the double-pole, double-throw type, having terminals 33–38 as shown. The construction of switch 28 is such that terminal 34 is common to terminals 33 and 35, and terminal 37 is common to terminals 36 and 38. The off position of switch 28 places contact 34 in connection with contact 33, and contact 37 with contact 36. In the on position, terminal 34 is connected with terminal 35;

and contact 37 is connected to contact 38, which is open.

Internally of the power converting apparatus 14, a Zener diode 39 and a resistor 41 are connected in series with light 29, which is preferably a neon lamp. Zener diode 39 has a breakdown voltage of approximately 110 volts. This series circuit is connected from lead wire 21 (in parallel with terminal 33 of switch 28) to ground. Circuit breaker 32 is also connected to lead wire 21 and is thereafter connected to one side of the duplex plug receptacle 31, the opposite side being connected to ground by a connecting wire 42.

With switch 28 in the off position, the electrical system operates normally with voltage regulator 13 in control. Switch 28 causes lead wires 21 and 22 to be electrically connected as well as lead wires 24 and 25. Battery 11 supplies voltage to the alternator field winding from its positive terminal through a portion of lead wire 22, the connecting circuit 26, the internal circuitry of voltage regulator 13, the field terminal F thereof and connecting wire 27. Consequently, rotation of the alternator 12 generates an output voltage at its battery terminal B which is made available to battery 11 through lead wires 21 and 22 in a regulated form by reason of the connecting circuit 26 to voltage regulator 13.

The secondary voltage emanating from relay terminal R of alternator 12 is connected directly to the relay terminal R of regulator 13 through lead wires 24 and 25, which are connected by the switch 28. The field relay of regulator 13 is normally open to prevent battery 11 from discharging when the automotive electrical system is not in operation, and the application of voltage through the relay terminal R of regulator 13 causes the field relay to close, thus rendering the regulator 13 operative and in control of the charging voltage applied to battery 11.

This regulated voltage potential existing in lead wire 21 is sensed by the Zener diode 39, but since it is on the order of 12 volts Zener diode 39 does not conduct and neon lamp 29 cannot light. The regulated voltage does appear across the terminals of duplex receptacle 31 at this time.

With switch 28 moved to its on position, lead wire 24 is connected through terminal 37 to dead terminal 38, thus causing an open circuit between lead wires 24 and 25. Consequently, the output voltage from the relay terminal R of alternator 12 is unable to reach the relay terminal R of regulator 13, thus causing the field relay to open. Consequently, the field winding of alternator 12 can no longer be excited through the internal circuitry of regulator 13. However, lead wire 22 is at this time connected to lead wire 23 by the switch 28, thus providing a direct circuit from the positive terminal of battery 11 to the field winding of alternator 12. Rotation of the alternator 12 therefore results in a generated voltage applied through lead wire 21 to the power converting apparatus 14. Because at this time terminal 33 is no longer connected with terminal 34, all output voltage of the alternator 12 is applied to the internal circuitry of power converting apparatus 14. If the rotational speed of the engine which drives alternator 12 is sufficiently fast, alternator 12 will generate a voltage in excess of 110 volts, at which time Zener diode 39 breaks down and cause neon lamp 29 to light. Resistor 41 acts as a load to alternator 12 at this time, preventing damage thereto by reason of excessive current flow. Resistor 41 provides this loading function whether or not electrical equipment is being used through the duplex plug receptacles.

With engine speed kept at a level just sufficient to light neon lamp 29, approximately 110 volts is made available at duplex plug receptacle 31 and electrical equipment not constituting an inductive load can be plugged in and used at this time. Circuit breaker 32 offers full protection to both the electrical equipment and the alternator 12 in the event of current overflow.

With further reference to FIG. 1, an accessory device 43 is shown for use with the power converting apparatus 14. Accessory 43 comprises a pair of cables connectable to the apparatus 14 through a standard plug 44. The cables terminate at their opposite ends in clamps 45 which may be cooperatively used for light-duty welding or for fast battery charging. In the latter case, a standard automobile battery may be charged quite rapidly if output of the power converting apparatus 14 is limited to about 50 volts with the clamps 45 connected to the battery for no more than two or three minutes. At such a voltage, an automobile battery can be fully charged in this amount of time without damage.

I claim:

1. Power converting apparatus for use in an electrical system including an electrical storage battery, variable output voltage generating means having a field winding energizable by an external source to enable the generation of electrical energy thereby, and regulator means for controlling the voltage level applied to the battery from the voltage generating means and for switchably connecting the battery to said winding for energization thereof, the power converting apparatus comprising:
   a. power outlet means;
   b. first connector means for connecting the power outlet means to the output of the voltage generating means so that the power outlet means is in continuous electrical communication with the voltage generating means to receive its full range of voltage potential;
   c. switch means having a common pole and first and second poles selectively connectable with the common pole;
   d. the first pole being connected to the first connector means;
   e. second connector means for connecting the common pole with the battery and the regulator means;
   f. and third connector means for connecting the second pole and the field winding of the voltage generating means;
   g. whereby selective connection of the common and first poles of the switch means maintains the battery at a regulated potential and applies said regulated potential to the power outlet means;
   h. and selective connection of the common and second poles of the switch means connects the battery directly with said field winding and maintains the power outlet means at the unregulated output potential of the voltage generating means.

2. The power converting apparatus defined by claim 1, wherein the power outlet means comprises a grounded plug receptacle.

3. The apparatus defined by claim 1, and further comprising means for sensing and indicating a predetermined output voltage of the voltage generating means.

4. The apparatus defined by claim 3, wherein the sensing and indicating means comprises a light and a Zener diode connected to conduct electrical energy to the light only when the output voltage of the voltage generating means reaches said predetermined level.

5. The apparatus defined by claim 1, and further comprising impedance means connected with respect to the power outlet means to provide an electrical load for the voltage generating means when voltage is not used at the power outlet means.

6. The apparatus defined by claim 5, wherein the impedance means and the power outlet means are connected in parallel with respect to the output of the voltage generating means.

7. The apparatus defined by claim 1, and further comprising circuit breaking means connected in series with the power outlet means.

8. An electrical system, comprising:
 a. an electric storage battery;
 b. variable output voltage generating means having a field winding energizable by an external source to enable the generation of electrical energy thereby;
 c. regulator means for controlling the voltage level applied to the battery from the voltage generating means and for switchably connecting the battery to said winding for energization thereof;
 d. and apparatus for converting the output of the voltage generating means for use outside the electrical system, comprising
  i. power outlet means;
  ii. first connector means for connecting the power outlet means to the output of the voltage generating means so that the power outlet means is in continuous electrical communication with the voltage generating means to receive its full range of voltage potential;
  iii. switch means having a common pole and first and second poles selectively connectable with the common pole;
  iv. the first pole being connected to the first connector means;
  v. second connector means for connecting the common pole with the battery and the regulator means;
  vi. and third connector means for connecting the second pole and the field winding of the voltage generating means;
  vii. whereby selective connection of the common and first poles of the switch means maintains the battery at a regulated potential and applies said regulated potential to the power outlet means;
  viii. and selective connection of the common and second poles of the switch means connects the battery directly with said field winding and maintains the power outlet means at the unregulated output potential of the voltage generating means.

9. The electrical system defined by claim 8, wherein the power converting apparatus further comprises circuit breaking means disposed in series with the power outlet means.

10. The electrical system defined by claim 8, and further comprising a pair of cables each having one end electrically connectable with the power outlet means, the opposite end of each cable terminating in an electrically conductive clamping device.

11. The electrical system defined by claim 10, wherein the power outlet means comprises a grounded plug receptacle, and said one end of the cables are cooperatively joined in a plug.

12. The electrical system defined by claim 8, wherein:
 a. the voltage generating means further comprises a secondary voltage output;
 b. the voltage regulating means further comprises a relay for sensing said secondary voltage and operable below a predetermined voltage level to preclude said field winding from being energized by the battery;
 c. and the power converting apparatus further comprises second switch means for selectively establishing electrical communication between the secondary voltage output and said relay.

13. The electrical system defined by claim 12, wherein the power converting apparatus further comprises means for indicating a predetermined voltage level of the voltage generating means.

14. The electrical system define by claim 12, wherein the second switch means establishes said electrical communication when the first and common poles of the first named switch means are connected.

15. The electrical system defined by claim 14, wherein the first named switch means and the second switch means together comprise a double pole, double throw switch.

16. The electrical system defined by claim 15, wherein the voltage generating means is an alternator.

17. The electrical system defined by claim 16, wherein the second connector means is connected to the positive terminal of the battery.

* * * * *